Sept. 28, 1971 R. B. ASHBY 3,608,204
VESSEL FOR STORING GRAIN
Filed April 23, 1969 2 Sheets-Sheet 1

INVENTOR
ROBERT BARRY ASHBY

BY *Harold W. Adams*
ATTORNEY

INVENTOR
ROBERT BARRY ASHBY

BY *Harold W. Adams*
ATTORNEY

United States Patent Office
3,608,204
Patented Sept. 28, 1971

3,608,204
VESSEL FOR STORING GRAIN
Robert Barry Ashby, 8925 Falling Creek Court,
Annandale, Va. 22003
Filed Apr. 23, 1969, Ser. No. 827,452
Int. Cl. F23b 19/00
U.S. Cl. 34—218
13 Claims

ABSTRACT OF THE DISCLOSURE

A method of storing grain comprising the steps of placing harvested grain directly in a storage vessel; passing drying air throughout said mass of grain in said vessel to remove moisture therefrom; passing a fumigant throughout said mass of grain stored in said vessel; and sealing said vessel with said grain therein.

The storage vessel is spheroid in shape and fabricated on site. The vessel is formed of vertically extending meridianal ribs to which is attached a wire mesh. The ribs and wire mesh are encased in an inner core of a sprayed elastomeric coating of urethane or similar foam. An interior and exterior coating of an epoxy resin is applied to the inner foam core to provide a sealed vessel. A sealed grain loading port is provided at the top while a discharge port and gas intake opening is formed in the base. The entire vessel is rigidly mounted on its vertical axis on a supporting base.

The exterior epoxy coating may include suitable coloring pigmentations for heat reflection as well as fungicides and pesticides to completely protect the stored grain. Means are provided for dispersing air into the base and throughout the vessel to accelerate drying and fumigation. A safety port may be mounted in the top or sidewalls for removing test specimens and for providing pressure plugs to relieve any determined pressure build up within the vessel.

BACKGROUND OF THE INVENTION

The problems of grain storage have been present for centuries in nearly all countries. It is even more critical with an exploding population and growing food shortage. Conventionally storage facilities, depending upon the type of grain, are inefficient because of the inherent spoilage capability and expensive because of, not only labor in loading, unloading and treating, but in the cost of fabrication.

In spite of improved materials and technology and advancements in construction techniques, these concepts have not been heretofore fully utilized and applied to grain storage facilities to the inventor's knowledge. Grain storage facilities remain as concrete silos, corrugated steel cylinders, and wire mesh bins, all of which are costly to erect and ineffiecient because of grain spoilage—due to the atmosphere, vermin and rodents.

OBJECTS OF INVENTION

The objects of this invention therefore are to provide an improved method of and vessel for storing grain in which the grain is maintained in a sealed, controlled, and rodent and insect proof environment.

A further object of this invention is to provide a method of storing grain in which the harvested grain is directly loaded into a vessel; dryed and treated within said vessel, and sealed within a controlled environment within said vessel.

Still another object of this invention is to provide a spheroidal shaped vessel, fabricated on site of a meridianal rib framework and wire mesh covering for strength encased within a self setting foam core and an exterior, sealing coating resin that may include selected color pigmentation, fungicides and pesticides.

Yet another object of this invention is to provide a storage vessel for grain including separate loading and unloading ports, and means for sealing said ports.

A further object of this invention is to provide a sealed vessel for storing grains, and means for directing a stream of air throughout said mass of grain within said vessel.

THE INVENTION

These and many other objects may be achieved in accordance with the principles of the method of this invention which in general may include the steps of loading freshly harvested, untreated grain directly into a vessel; drying said grain within said vessel; fumigating said grain within said vessel; sealing said vessel; and maintaining said environment within said vessel.

A vessel in accordance with a preferred embodiment of this invention comprises a spheroidal framework of meridianal reinforcing ribs rigidly attached to hollow cylindrical upper and lower casings, the longitudinal axis of which coincide with the vertical axis of said spheroidal framework; a wire mesh grid secured to said rib structure; an insulating foam core encasing said grid and said ribs; and an interior and exterior layer of plastic resin applied to said foam core. A cover for said upper casing provides a sealed loading port while a sealed port in the lower casing may also provide an inlet port for admitting treated air into the vessel which passes throughout the grain mass within the vessel.

In an alternative embodiment of the invention the meridianal ribs may be formed of perforated conduits interconnected with the unloading ports or an air inlet opening in the lower casing dispersing treated air throughout the vessel. Yet another embodiment of the invention may include a centrally positioned conduit connected to an air inlet in the lower casing; and perforated limbs extending from and interconnecting said central conduit for dispersing air throughout said vessel. Yet another may include a central conduit for directing an air stream against a baffle plate supported above said central conduit.

The top sealing cover and/or the sidewalls may also be provided with ports for removing test samples and which may include safety blow out plugs in the event of pressure build up within the vessel.

These and many other objects and advantages of the invention will become apparent from the following detailed description of a preferred and alternative embodiments of the invention when read in view of the appended drawing wherein.

Figure 1:
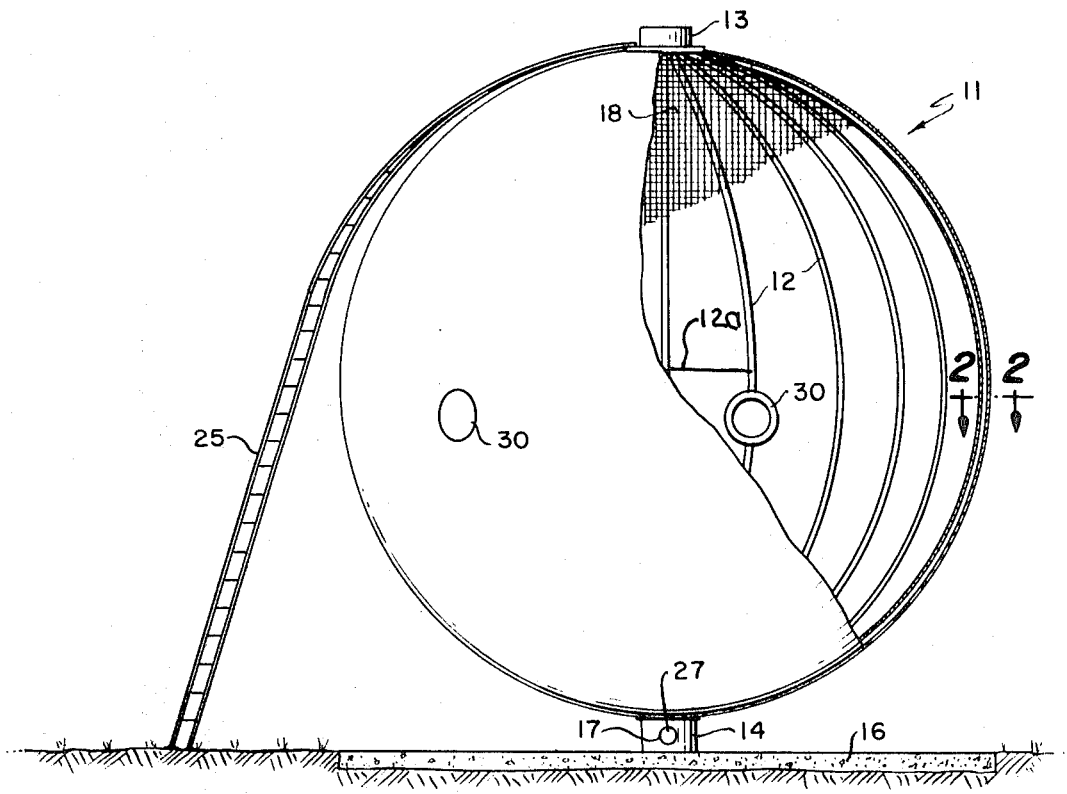
FIG. 1 is a partial section, side elevational view of a preferred embodiment of the invention illustrating the spherodial shape of the storage vessel.
Figure 2:
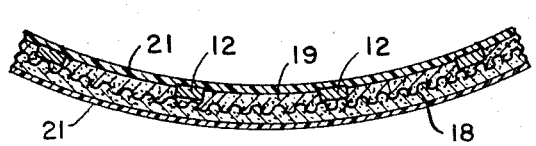
FIG. 2 is a partial sectional view taken along the lines 2—2 of FIG. 1 illustrating the insulating sandwich type sidewall construction of the vessel.
Figure 3:
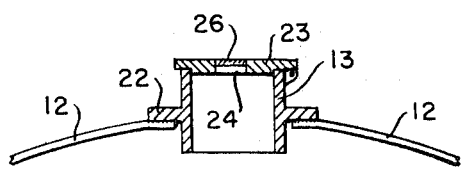
FIG. 3 is a partial sectional view of FIG. 1 illustrating a top casing, to which the meridianal ribs are attached.

Referring now to FIGS. 1, 2 and 3 of the drawing, a grain storage vessel in accordance with a preferred embodiment is shown as a spheroid, designated generally by the reference numeral 11, formed of preformed, prestressed ribs 12, made of steel or the like, rigidly secured, as by bolting or welding to an upper cylindrical casing 13, and a lower cylindrical casing 14. The lower casing 14 is rigidly mounted in a concrete base 16, and is provided with a discharge port or opening 17.

As shown in FIG. 2, the sidewall of the spheroid 11 is formed of the meridianal ribs 12, having a wire grid 18 attached to the exterior side of the ribs with clips, or wires. One or more wire strainers 12a extending diametrically through the vessel and attached to the ribs 12 at opposite ends may also be provided for further structural support of the vessel when loaded to prevent sagging and distortion of the sidewalls. This grid is encased within elastomeric urethane foam or other suitable self setting foam sprayed onto both sides of the grid and ribs to form an inner core 19. This inner core is sprayed with an epoxy resin on the inside and outside to provide a tough strong moisture proof covering 21. In applying the outer coating, the plastic resin may also include selected color pigmentation and insecticide and fungicides to form a rodent and insect proof vessel.

Both the upper and lower casings 13 and 14 are cylindrical and formed of sheet steel or other suitable material having an integral flange 22 formed thereon. The meridianal ribs are then bolted or welded to the flange. As shown in FIG. 3 the upper casing 13 forms a loading port and is provided with a sealing cap 23 which may include a port 24 having a pressure plug 26 detachably mounted therein.

The lower casing 14, similar to the upper casing 13, supports the entire vessel 11 and is rigidly mounted on the concrete pad or base 16. The discharge port 17 is provided with a removable sealing cover 27 for unloading grain from the vessel.

In addition the discharge port 17 is used for admitting heated air and gaseous fumigide and insecticides directly into the vessel 11. Safety plugs 30 may also be provided within the sidewall for removing test samples and as blow outs in the event of excessive pressure build up within the vessel. These plugs 28 may be integrally formed in the meridianal ribs 12 at spaced intervals and at selected heights above the ground level. A detachable ladder 25 is provided for reaching the loading port at the top of the vessel.

Figure 5:
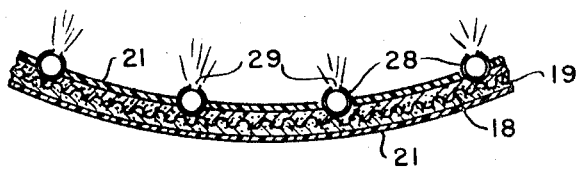
FIG. 5 is a sectional view of the sidewall of an alternative embodiment of a storage vessel in accordance with this invention.
Figure 4:
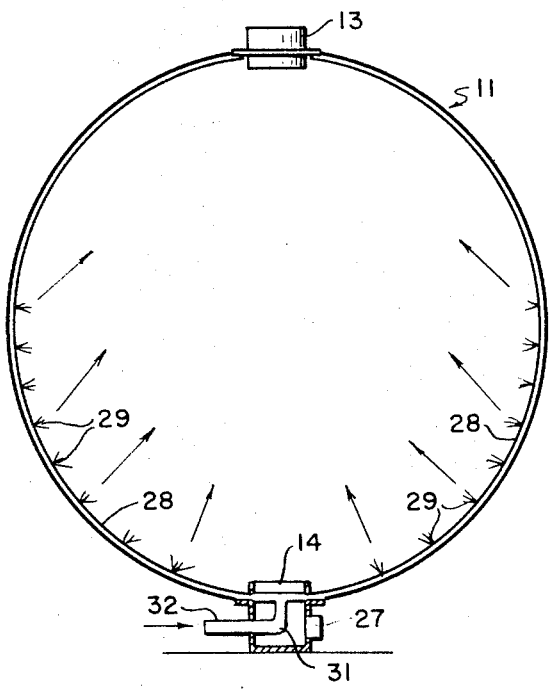
FIG. 4 is a side elevational sectional view of the alternative embodiment.

As shown in FIGS. 4 and 5 an alternative embodiment 28 of the vessel may include tubular metal preformed meridianal ribs that form conduits and having spaced perforations 29 along slightly more than half their length from the bottom. These perforations 29 are plugged during erection of the vessel 11 and opened after the interior coating of epoxy is applied. The perforations may be screened to avoid becoming clogged by the grain if desired. The perforated conduit ribs 28 are interconnected with an air supply line 31 within the lower casing which in turn is connected to an air input opening 32.

To dry grain within the vessel 11 heated air of determined temperatures is blown through the input opening 32, line 31 and out the perforations 29 into the grain mass. The perforations are arranged to direct heated air and gas radially toward the center of the vessel. The heated air then rises through the vessel and out the loading port. Similarly gaseous fumigant and insecticides is also passed through the perforated ribs and the grain and out the loading port.

Figure 6:
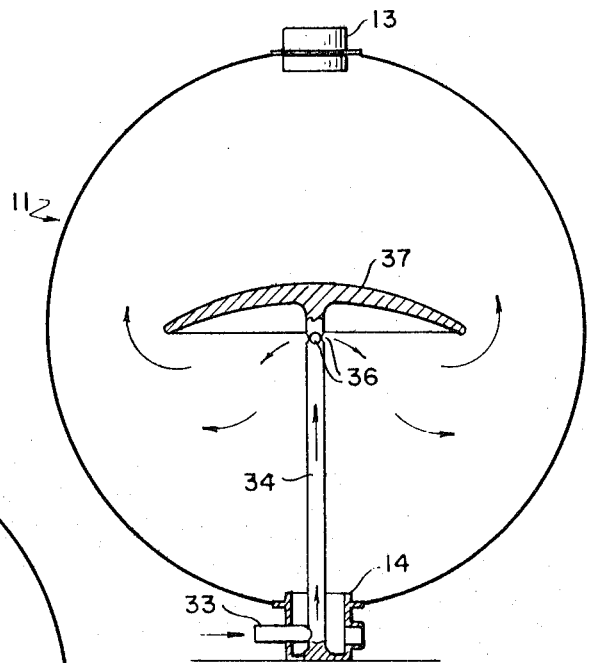
FIG. 6 is a side elevational sectional view of another alternative embodiment illustrating a baffle for distributing air throughout said vessel.

FIG. 6 discloses a further embodiment of the invention for treating grain within the vessel. In this arrangement heated air, fumigant, such as fungicides and or insecticides are passed through an opening 33 into a central conduit 34 under pressure. The treated air is emitted through spaced openings 36 in the central conduit against a downturned, concave baffle or shield 37 attached to the central conduit. The baffle 37 which may be solid in cross section as shown or formed of spaced arms disperses the air stream downwardly and radially throughout the grain mass before it rises and escapes through the open loading port.

Figure 7:
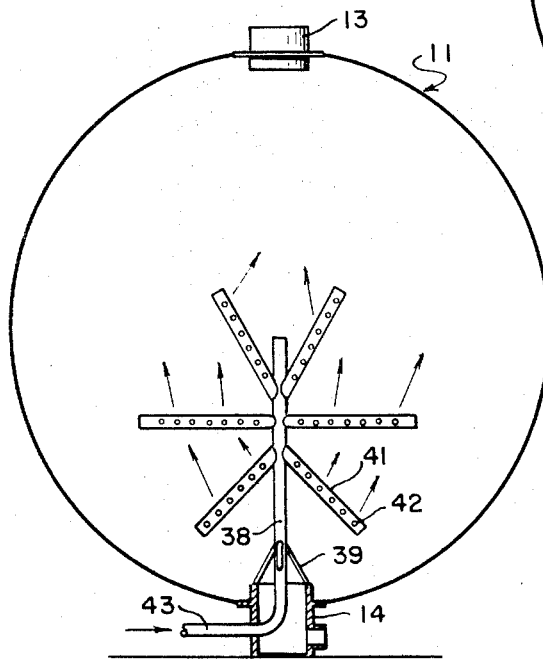
FIG. 7 is a side elevational sectional view of another alternative embodiment of this invention illustrating a central conduit and interconnecting limbs for dispersing air throughout said vessel.

FIG. 7 illustrates another embodiment of the invention for dispersing treated air throughout the vessel 11. A vertical conduit 38 supported by legs 39 attached to the upper edge of lower casing 14 is provided with angularly extending conduits 41 having spaced perforations 42 along their length. The hollow conduits 41 interconnect with the central conduit 38 which is directly connected through an inlet 43 to an air supply source not shown. Heated air, and fumigant such as fungicides and insecticides are forced through the central conduit 38 and the perforated arms throughout the vessel 11 before escaping through the loading port.

Referring again to FIGS. 1, 2 and 3 in a preferred embodiment the meridianal ribs 12 may be of preformed steel stock 1 inch wide by ⅛ inch thick. To this is attached a nine inch mesh or grid 18 on the outside of the ribs. The inner core 19 is of urethane foam which is sprayed onto both sides of the grid at a thickness of one-half inch on each side. Over this core is sprayed, both interior and exterior, an epoxy resin coating .060 inch outside—.030 inch inside in thickness. This outer coating may also include reinforced fiber and dispersed insecticide and fungicide. The resulting sidewall sandwich type structure has extremely good heat insulation characteristics which may be further enhanced by adding heat reflecting coloring pigmentation to the epoxy coating. The vessel 11 is light in weight (0.8 pound per square foot), possesses high tensile strength (20,000 p.s.i. tensile yield) and may, by using this novel sandwich sidewall construction, be fabricated on site in any desired geometrical configuration.

CALCULATIONS AND TABULAR DATA

The following illustrates the outstanding strength characteristics and economic advantages of this invention.

TABLE (1) Calculation of weight per square foot for sandwich sidewall structure of a preferred embodiment of the invention.

$$\text{Epoxy} = 1 \text{ ft.}^2 \times \left(\frac{0.030 \text{ in.} + 0.06 \text{ in.} \times \text{ft.}}{12 \text{ in.}}\right)$$

$$\times \frac{86 \text{ pounds}}{\text{ft.}^3} = 0.645 \text{ pounds}$$

$$\text{Steel} = 18 \text{ strands} \times \left(\frac{\pi \times 0.016^2 \text{ in.}^2 \times 12 \text{ in.}}{4 \text{ strand}}\right)$$

$$\times \frac{0.283 \text{ pounds}}{\text{in.}^3} = 0.0123 \text{ pound}$$

$$\text{Foam} = 1 \text{ ft.}^2 \times \left(\frac{\text{lin. ft.}}{12 \text{ in.}}\right) \times \frac{2 \text{ pounds}}{\text{ft.}^3} = 0.167 \text{ pound}$$

Total weight of sandwich structure per square foot=0.824 pound.

(2) Calculation of spherical grain bin weight and area for set volumes.

| Capacity (bushels) | Capacity (ft.³) | Radius (feet) | Spherical area (ft.²) | Bin weight, w/o ribbing (pounds) |
|---|---|---|---|---|
| 1,000 | 1,244 | 6.64 | 559 | 460 |
| 3,000 | 3,730 | 9.57 | 1,161 | 950 |
| 5,000 | 6,220 | 11.38 | 1,645 | 1,356 |
| 8,000 | 9,950 | 13.37 | 2,270 | 1,870 |
| 10,000 | 12,444 | 14.39 | 2,639 | 2,158 | where:
    (a) Volume sphere=$4/3\pi r^3$
    $r = \sqrt[3]{\dfrac{\text{volume}}{4.189}}$
    (b) Area sphere=$4\pi r^2 = 1257 r^2$
    (c) Weight=area×0.824
(3) Calculation of stress.

| Capacity (bushels) | Gravity load[1] (pounds) | Maximum stress[2] (p.s.i.) | Safety factor |
| --- | --- | --- | --- |
| 1,000 | 60,000 | 412 | 47.5 |
| 3,000 | 180,000 | 855 | 23.4 |
| 5,000 | 300,000 | 1,200 | 16.7 |
| 8,000 | 480,000 | 1,630 | 12.3 |
| 10,000 | 600,000 | 1,890 | 10.6 |

[1] Using 60 pounds per bushel loading density.
[2] $S_{max.}$ = Membrane stress spherical radius $\div$ 2 $\times$ wall thickness.

NOTE.—These calculations do not consider gravity load stress which is to be borne by the steel ribs. Strength of the sidewall is estimated at 20,000 p.s.i.

(4) Calculations for rib members.

| Capacity (bushels) | Meridianal rib length (feet) | Rib weight (pounds)[1] | Rib stress (p.s.i.)[2] | No. of ribs[3] | Safety factor |
| --- | --- | --- | --- | --- | --- |
| 1,000 | 20.82 | 8.85 | 35,720 | 21 | 2.34 |
| 3,000 | 30.40 | 12.90 | 48,000 | 30 | 1.77 |
| 5,000 | 35.78 | 15.20 | 66,600 | 36 | 1.28 |
| 8,000 | 42.00 | 17.83 | 80,000 | 48 | 1.06 |
| 10,000 | 45.20 | 19.20 | 82,900 | 58 | 1.03 |

[1] Using steel at 1 inch wide by 1/8 thick and 0.425 lb./linear feet.
[2] Using tensile strength of 85,000 p.s.i. minimum and rib stress equals gravity loading $\div$ (number of ribs $\times$ rib area).
[3] Rib placed $\cong$ each 2 feet on circumference.

Note 1.—Safety factor is ratio of maximum tensile over rib stress.

Note 2.—Stacks (2) at 30 inch diameter x 12 inch deep x 1/4 inch wall 4130 steel/heat treated fabricated with rib attachments and auger port in bottom stack.

The cost of assembly of these preferred embodiments at the field site of grain storage is less expensive than conventionally constructed bins or silos. Conventional bins are estimated to cost approximately 100% to 600% more for installation. The reinforced concrete foundation cost is the same for either type.

In practicing the method of this invention, the freshly harvested grain, wheat, oats, shelled corn, rye, etc., or milled grain such as flour is loaded directly into the storage vessel 11 through the loading port. Air heated at the desired temperature is then forced through the lower port 17 under pressure into the vessel. The heated air rises and passes upwardly in the vessel thoroughly drying the grain before escaping and out the loading port. This is continued until the grain is dried and substantially all moisture is removed. Simultaneously with the drying step or subsequent thereto, a suitable gaseous fumigant such as fungicide and or insecticide is forced under pressure or volatilized and naturally converted into the grain mass. The fumigant passes through the vessel and escapes through the loading port.

Alternatively, the loading port of the vessel may be sealed after heating, filled with fumigant, and sealed for a determined period to destroy any insects and vermin within the grain. Thereafter the vessel may again be flushed with hot air before final sealing, or sealed with the fumigant within the vessel. This may be accomplished with the preferred or alternative embodiment structures of the invention. As the vessel is sealed, moisture, rodent and insect proof, the grain or flour is now stored within an environment subject only to temperature and pressure changes within the vessel as determined by atmospheric conditions. Because of the high insulating characteristics of the sidewall structure such changes are small. Test samples may be removed from the vessel periodically as desired. In the event of excessive pressure build up within the vessel the safety blow out plugs 26 and 28 are provided to prevent fracture or rupture of the vessel.

Having disclosed this invention and described methods and a preferred as well as alternative embodiments in detail.

What is claimed is:

1. A storage vessel, comprising:
   (a) a plurality of preformed reinforcing meridianal ribs;
   (b) means for interconnecting said meridianal ribs at the top and bottom along a vertical axis to form a spheroid, said interconnecting means providing top and bottom openings in said vessel for loading and unloading and injecting gas into said vessel repectively;
   (c) means for sealing said top and bottom openings;
   (d) a wire mesh secured to said meridianal ribs;
   (e) an elastomeric plastic foam core encasing said meridianal ribs and said wire mesh; and
   (f) a coating of plastic formed on said inner and outer spherical surfaces of said core to form a sealed spheroidal storage vessel.

2. Apparatus as defined in claim 1 wherein said (b) means interconnecting said meridianal ribs comprises:
   top and bottom cylindrical casings, the longitudinal axis of said top and bottom casings coinciding with the vertical diametrical axis of said spheroidal shaped vessel, said meridianal ribs being rigidly attached to the outer periphery of said top and bottom casings, said bottom casing being rigidly mounted on a supporting base.

3. A storage vessel as defined in claim 2 wherein said top and bottom casings have external peripheral flanges formed thereon and to which said meridianal ribs are attached.

4. A storage vessel as defined in claim 2 wherein said bottom casing includes an input opening for admitting gas into said vessel; and means for sealing said input opening.

5. A storage vessel as defined in claim 4 wherein said meridianal ribs are formed of conduits having spaced perforations along a portion of the length thereof, said spaced perforations commencing at the lower end of said conduits in the interior of said vessel and radially of the center of said spheroidal vessel; and
   means for interconnecting said conduits with said gas input opening.

6. Apparatus as defined in claim 4 wherein said bottom casing includes a vertical conduit rigidly mounted within and extending along the longitudinal axis of said bottom casing;
   means for interconnecting said vertical conduit with said input opening;
   perforations formed in the sidewall of and at the upper end of said vertical conduit; and
   baffle means attached to said vertical conduit for dispersing gas within said vessel discharged from said perforations in said vertical conduit.

7. A storage vessel as defined in claim 4 wherein said bottom casing includes a vertical central conduit attached thereto, said central conduit interconnecting with said input opening;
   angularly extending arms formed on and interconnecting the interior of said central conduit, said arms having spaced perforations along the length thereof.

8. A storage vessel as defined in claim 1 including at least one port in said vessel; and
   a blow out plug for sealing said port and for relieving any pressure build up within said vessel when the pressure therein exceeds a determined value.

9. A storage vessel as defined in claim 8 wherein said port is formed in the sidewall of said vessel and extends through a meridianal rib thereof.

10. Apparatus as defined in claim 8 wherein said port is formed in the means for sealing said top casing.

11. A storage vessel as defined in claim 1 including color pigmentations having heat reflective properties in the outer plastic coating of said vessel.

12. A storage vessel as defined in claim 1 in which said outer plastic coating of said vessel includes an insecticide and rodenticide.

13. A vessel as defined in claim 1 including at least one strainer affixed to opposing ribs and extending diametrically within said vessel.

References Cited

UNITED STATES PATENTS

| | | | |
|---|---|---|---|
| 2,510,372 | 6/1950 | Bloxham | 34—36X |
| 2,929,154 | 3/1960 | Finnegan | 34—92 |
| 3,097,916 | 7/1963 | Dawson | 34—218UX |

EDWARD J. MICHAEL, Primary Examiner

U.S. Cl. X.R.

220—1, 9, 18